United States Patent [19]
Junck et al.

[11] 3,928,201
[45] Dec. 23, 1975

[54] FILTER MOUNTING AND BYPASS VALVE ASSEMBLY

[75] Inventors: John A. Junck, Joliet; Eugene E. Latimer, Wilmington, both of Ill.

[73] Assignee: Caterpillar Tractor Co., Peoria, Ill.

[22] Filed: Aug. 8, 1974

[21] Appl. No.: 495,589

[52] U.S. Cl.................................. 210/132; 210/441
[51] Int. Cl.².................................. B01D 27/10
[58] Field of Search ........... 210/130, 132, 172, 438, 210/441, 439, DIG. 14

[56] References Cited
UNITED STATES PATENTS

| | | | |
|---|---|---|---|
| 3,269,540 | 8/1966 | Rosaen | 210/172 |
| 3,344,923 | 1/1970 | Pall | 210/132 |
| 3,487,930 | 1/1970 | Rosaen | 210/172 |
| 3,572,508 | 3/1971 | Rice | 210/130 |
| 3,794,168 | 2/1974 | Perkins | 210/130 |
| 3,886,072 | 5/1975 | Dezelan | 210/130 |

*Primary Examiner*—Frank A. Spear, Jr.
*Assistant Examiner*—Ernest G. Therkorn
*Attorney, Agent, or Firm*—Phillips, Moore, Weissenberger Lempio & Strabala

[57] ABSTRACT

A filter assembly includes a housing within which is disposed a filter element with resilient support means at one end. Inlet means direct fluid to the filter, through which such fluid normally flows. The fluid then normally flows through outlet means defined by the housing. The fluid flowing through the inlet means is in communication with a valve including a valving element movable toward the filter element to allow fluid to flow from the inlet means to the outlet means, bypassing the filter element. A helical spring is disposed between the valving element and the resilient support means for the filter element to bias the valving element in a position so that the fluid is normally directed through the filter element. An increase of the fluid pressure in the filter element moves the valve element toward the filter element against the resilience of the spring, so that the fluid bypasses the filter element.

6 Claims, 1 Drawing Figure

U.S. Patent  Dec. 23, 1975  3,928,201
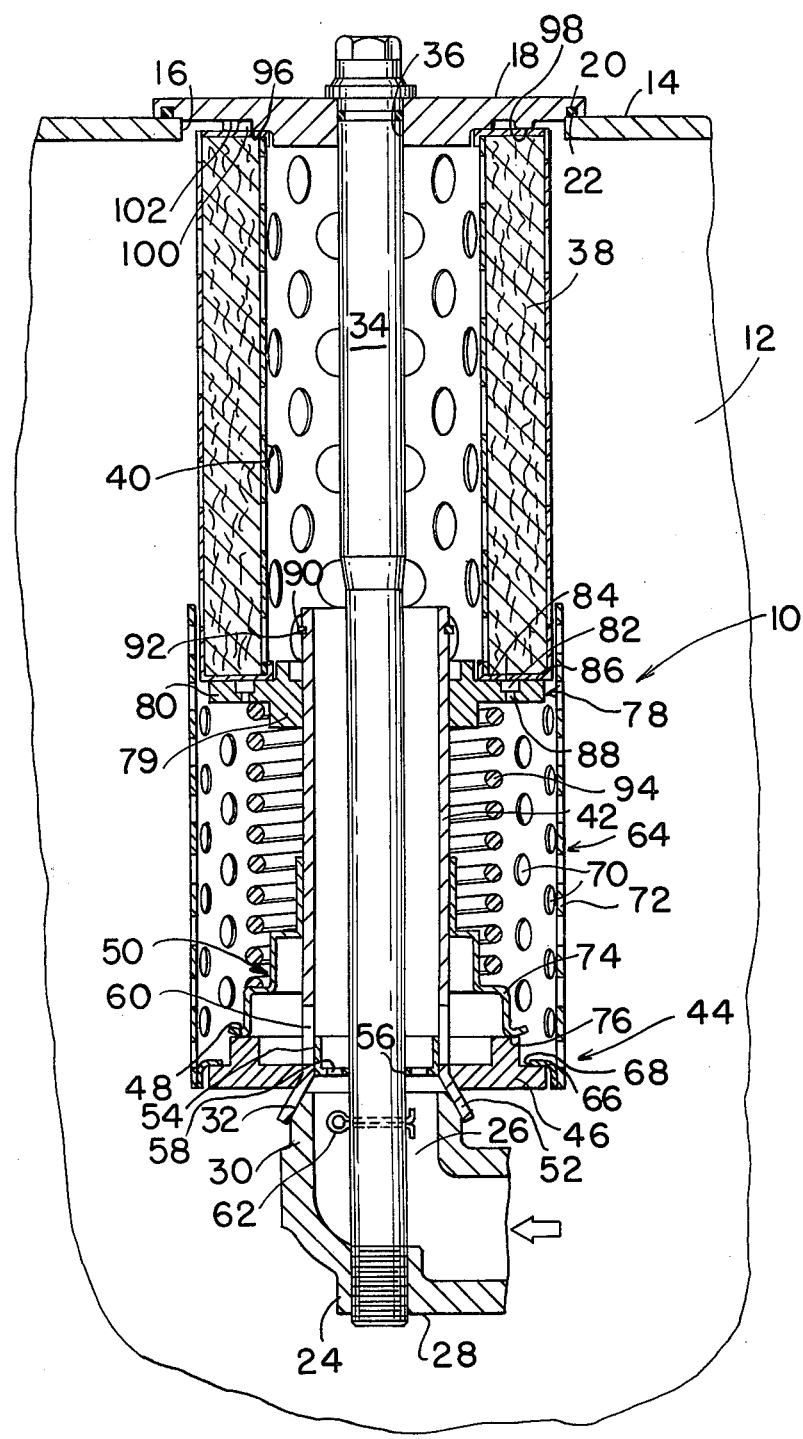

FILTER MOUNTING AND BYPASS VALVE ASSEMBLY

BACKGROUND OF THE INVENTION

This invention relates to a filter assembly, and more particularly, to a filter assembly incorporating a bypass valve.

Hydraulic circuits and oil lubricating systems generally employ filters to remove contaminants from the fluid. Because of the need for continuous supply of fluid and to prevent rupture of the filter element and the consequent contamination of the fluid, these filter assemblies are provided with a bypass valve. The bypass valve is designed to open when the filter becomes so clogged as to cause a predetermined pressure rise in the fluid circuit. The opening of the valve permits fluid to bypass the filter element to supply the demands of the system.

In the prior art, various filter assemblies of such type are known. Of such prior art filter assemblies, a large percentage incorporates resilient helical springs and/or movable valving elements which extend inwardly of the cylindrical center bore of the filter element. (See, for example, U.S. Pat. No. 3,235,085 to Humbert, U.S. Pat. No. 3,184,062 to Humbert, U.S. Pat. No. 3,221,880 to Wilkinson, U.S. Pat. No. 3,426,900 to Wilkinson et al, U.S. Pat. No. 3,085,688 to Eberle, U.S. Pat. No. 3,556,300 to Codo, U.S. Pat. No. 3,572,508 to Rice, and U.S. Pat. No. 3,628,661 to Codo, the last three mentioned references assigned to the Assignee of this invention.) Such a system, while being effective in use, generally requires the extremely careful design and manufacture of the valving parts involved, many of which have heretofore been castings, adding to the overall cost of the device.

U.S. Pat. No. 3,313,418 to Rosaen discloses a device (FIG. 4) which avoids the use of resilient springs and/or valving elements which protrude into the filter element. However, a study of that patent reveals that the structure involved therein is still relatively complicated in design and construction, involving a relatively complex baffle member with numerous slots and channels defined therein for use in cooperation with the actual movable valving element thereof.

Another construction disclosed in U.S. Ser. No. 355,474, filed Apr. 30, 1973 and assigned to the assignee hereof, has proven satisfactory except for damage to the filter resulting from the filter support arrangement. Attempts to solve that problem by increasing support area resulted in leakage around the filter and resultant contamination of the oil.

SUMMARY OF THE INVENTION

It is therefore an object of this invention to provide a filter assembly having a pressure-responsive bypass valve and associated structure which is free of the bore of the filter element of the assembly.

It is a further object of this invention to provide a filter assembly which, while fulfilling the above object, is extremely simple and inexpensive in design and construction, avoiding the use of cast parts where possible.

It is a still further object of this invention to provide a filter assembly which, while fulfilling the above objects, provides means for aiding in the simple installation of the filter assembly.

Broadly stated, the filter assembly disclosed herein comprises a housing comprising a housing body and an end cover and includes fluid inlet and outlet means. An annular filter element is disposed within the housing adjacent the end cover. Fluid-directing means are included for directing the fluid from the fluid inlet means through the filter element. Valve means are associated with the fluid-directing means and comprise a valving element movable to a first position away from the filter element so that the fluid-directing means direct fluid from the fluid inlet means through the filter element. The valving element is movable away from the first position toward the filter element to allow fluid to flow from the fluid inlet means to the fluid outlet means, bypassing the filter element. Resilient means are interposed between the valving element and filter support element, the valving element being biased thereby into the first position and being movable toward the filter element against the resilience thereof, the valve means being subjected to the fluid presure of the fluid introduced through the fluid inlet means to the filter element so that the valving element moves toward the filter element upon increased fluid pressure built up in the filter element.

BRIEF DESCRIPTION OF THE DRAWINGS

These and other objects of the invention will become apparent from the following specification when read in conjunction with the drawing, which is a longitudinal sectional view of a filter assembly embodying the present invention.

DESCRIPTION OF THE PREFERRED EMBODIMENT

As shown in the drawing, a filter retainer and bypass valve assembly is generally indicated by the reference numeral 10. The filter assembly 10 may include or be mounted in a suitable housing 12 which makes up a portion of a fluid reservoir or tank. The housing 12 includes an upper wall 14 in which is formed a circular opening 16 receiving the filter assembly. An end cover 18 is provided with an annular groove 20 which receives a seal 22 for sealing engagement with the upper wall 14 around opening 16. A mounting bracket 24 is integrally secured in any suitable manner, not shown, to the inside of the housing body 16, and has a passage 26 extending therethrough communicating with the interior of the filter. An inlet pipe or conduit 28 is formed integral with the lower side of the bracket 24, and includes an upwardly extending portion 30 which is integral with the upper side of the bracket 24, communicating with the inlet pipe 28 through the passage 26. A tapered seat 32 is formed on the upper end of the upper conduit portion 30. An elongated bolt 34 extends through a central aperture 36 in the cover 18 and is threadably secured to the mounting bracket 24 for holding the end cover 18 in place.

An annular filter element 38 is mounted within the housing body 16 against the end cover 18 and a lower resilient or floating support member to be described. The filter element 38 is of tubular configuration and has a tubular center bore 40 to which fluid is communicated. Fluid-directing means in the form of an elongated tubular support and conduit member 42 interconnects the upper conduit portion 30 and the filter element 38, extending into and communicating with the bore 40 of the filter element 38. Such tubular member 42 directs fluid from the inlet conduit 28 and 30 through the filter element 38, and from the filter element 38 outwardly thereof and back into the tank 12.

Thus, the fluid outlet means of the filter assembly communicate directly with the tank 12.

A bypass valve assembly 44 includes an annular valve seat member 46 disposed about the lower end of tubular member 42 and includes means defining a valve seat 48, and a substantially tubular valving element 50 mounted about the tubular member 42 and slidable therealong. The tubular member 42 defines a flared portion 52 at its lower end which generally surrounds and is in annular sealing contact with the end 32 of the upper conduit portion 30 which is most adjacent the filter element 38.

A cup-shaped member 54 is secured within the tubular member 42 adjacent to but elevationally spaced from the flared portion 52. A centrally disposed aperture 56 and a plurality of passages 58 extend through the cup-shaped member 54, with the bolt 34 extending through the central aperture 56. A plurality of passages 60 are provided in the flange portion of the cup-shaped member 54, and the wall of the tubular member 42. A cotter pin 62 is disposed rotatably in a hole in the bolt 34 below the cup-shaped member 54, the function of such cotter pin 62 being fully described in U.S. Pat. No. 3,556,300 cited above. A cylindrical casing 64 has a bottom wall or inwardly directed flange 66 with a centrally disposed aperture 68 formed therein. The flange 66 is slidably disposed upon the seat member 46 which is adapted for sealing engagement with the outside of the flared portion 52. A multiplicity of apertures 70 extend through the wall 72 of the casing 64.

The valve seat member 46 is supported by the bottom flared portion 52 of the tubular member 42. The valving element 50 defines an enlarged portion 74 which terminates in an annular rim 76 which is adapted for sealing engagement with the seat 48. An annular support member 78 is slidably disposed about the tubular member 42 and is axially and elevationally spaced from the valving element 50. The support member 78 includes an inner hub 79 and a radially extending support flange 80. The extending flange portion 80 is separated by a groove 82 into inner and outer sealing surfaces 84 and 86 adapted for sealing engagement with the end of the filter element 38. A plurality of drain ports 88 communicate groove 82 with the reservoir. This prevents the build-up of pressure between the support and seal surfaces 84 and 86 which would tend to force them away from the lower end of the filter element 38. The broad support area provided by these two surfaces support the filter element without damage thereto. The groove 82 and ports 88 define pressure vent means for the support area or member. The support area defined by the inner and outer support surfaces may be 50% or more of the area of the end of the filter element when the filter assembly is employed in a high pressure system. This would prevent the filter element from being crushed or damaged by spring member 94. A snap ring 90 is seated within an annular groove 92 formed in the tubular member 42, for retaining the ring member 80 on the tubular member 42.

A helical spring 94 is disposed about the tubular member 42, and is interposed between the filter element 38 and the valving element 50, actually being in contact with the support member 78 and the valving element 50. The spring 94 resiliently urges the valving element 50 into a first or closed position as shown in the drawing away from the filter element 38 and into sealing relation with the seat 48, and the enlarged annular portions 84 and 86 of the ring member 80 into sealing engagement with the filter element 38, biasing such elements in such positions.

The upper support means for the upper end of the filter element is similar in construction to the lower support means to provide adequate support as well as sealing of the end of the filter. The upper support means is formed in the cover or cap 18 and comprises inner and outer annular support surfaces 96 and 98 separated by an annular groove 100. A plurality of slots 102 are formed across the support surface 98 to provide vent means to vent the groove 100. This prevents a build-up of pressure across the entire upper face of the seal element.

When the assembly 10 is in operation, the components are installed as shown. Fluid from a hydraulic system (not shown) is transmitted through inlet pipe or conduit 28, passage 26, passages 58 in the cup-shaped member 54, tubular member 42, and into the filter element 38, all of which is allowed to take place with the valving element 50 in its first or closed position as shown in the drawings, i.e., positioned in the direction away from the filter element 38.

The fluid entering the assembly 10 is also transmitted through the passages 60 to the valving element 50 and valve seat member 46 to subject them to such fluid pressure. Such fluid exerts an upward force on the valving element 50. Under normal conditions, the pressure of the fluid is insufficient to unseat the valving element 50 from the seat member 46. However, should the filter become clogged with particles filtered from the fluid, a fluid pressure build-up in the filter 38 occurs. Because of such build-up, an upward force is exerted on the valving element 50 sufficient to move the valving element 50 away from the first position toward the filter element 38 against the resilience of the spring 94, whereby the valving element 50 is unseated from the seat member 46, allowing fluid to bypass the filter element 38 and return directly to the tank 14 through the apertures 70 in the casing 64.

To replace the filter element 38, the bolt 34 is unscrewed from the bracket 24 and withdrawn. The filter element 38 and bypass valve assembly 44 are retained on the bolt 34 as it is withdrawn, by engagement between the cup-shaped member 54 and the cotter pin 62. Once the assembly is withdrawn from the tank 14, the mechanic aligns the cotter pin 62 with the slots, not shown, in the cup-shaped member 54, and slips the bypass valve assembly 44 off the end of the bolt 34. The filter element 38 may then be freely removed from the bolt 34. The bypass valve assembly 44 is maintained in an assembled condition on the tubular member 42 by the snap ring 90. To install a new element 38, the foregoing steps are reversed.

It will be seen that herein is provided a filter assembly which is extremely simple in design and effective in use. The bypass valve components thereof, and other associated structure may be formed of sheet metal avoiding the complication and high cost of cast parts in this area. The assembly, being directly associated with a fluid retainer tank or reservoir 12, eliminates the need for a separate filter housing. In addition, the flared portion 52 described above pilots the filter retainer and bypass assembly into place during installation, making such installation quite convenient.

What is claimed is:

1. A filter assembly comprising:
    a housing having an opening for receiving a filter element, cover enclosing said opening, and including fluid inlet and outlet means;

an annular filter element mounted within said housing adjacent and having one end in engagement with the end cover;

enlarged conduit means for directing fluid from the fluid inlet means through the filter element;

valve means mounted on one end of said conduit means and comprising a valving element movable to a first position away from the filter element so that the fluid-directing means direct fluid from the fluid inlet means through the filter element, and movable away from the first position toward the filter element to allow fluid to flow from the fluid inlet means to the fluid outlet means, bypassing the filter element;

annular support means including seal means mounted on said conduit means for engaging and supporting the other end of said filter element;

said annular support means consisting of an inner hub member slidably mounted on said enlarged conduit means, a radially extending flange extending outwardly from said hub and integral therewith, an annular groove separating one side of said flange into inner and outer annular supporting surfaces engaging said other end of said filter element, and, vent ports extending from the groove to the other side of said flange; and, resilient means interposed between the valving element and the annular support and seal means, the valving element being biased thereby into said first position and movable toward the filter element against the resilience thereof, the valve means being subjected to the fluid pressure of the fluid introduced through the fluid inlet means to the filter element, so that the valving element moves toward the filter element upon increased fluid pressure built up in the filter element.

2. The filter assembly of claim 1 wherein said vent means comprises an aperture communicating said groove with the other side of said flange.

3. The filter assembly of claim 2 wherein said supporting surfaces cover more than 50% of the area of the end of said filter element.

4. The filter assembly of claim 3 wherein said end cover includes means including an annular groove defining inner and outer annular support surfaces engaging said one end of said filter element; and a plurality of radially extending slots extending across said outer annular support surface for venting said groove.

5. The filter assembly of claim 1 wherein said end cover includes means including an annular groove defining inner and outer annular support surfaces engaging said one end of said filter element.

6. The filter assembly of claim 5 including a plurality of radially extending slots formed in said outer annular support surface for venting said annular groove.

* * * * *